United States Patent
Mao et al.

(10) Patent No.: US 9,231,501 B2
(45) Date of Patent: Jan. 5, 2016

(54) ENERGY RETRIEVING DEVICE

(71) Applicant: FOXNUM TECHNOLOGY CO., LTD., Taichung (TW)

(72) Inventors: Ching-Hsiung Mao, Taichung (TW); Chih-Jung Liu, Taichung (TW)

(73) Assignee: FOXNUM TECHNOLOGY CO., LTD., Taichung (TW)

( * ) Notice: Subject to any disclaimer, the term of this patent is extended or adjusted under 35 U.S.C. 154(b) by 94 days.

(21) Appl. No.: 14/023,474

(22) Filed: Sep. 11, 2013

(65) Prior Publication Data

US 2014/0176025 A1 Jun. 26, 2014

(30) Foreign Application Priority Data

Dec. 25, 2012 (TW) .............................. 101149870 A

(51) Int. Cl.
  *H02P 3/18* (2006.01)
  *H02P 3/14* (2006.01)

(52) U.S. Cl.
  CPC ....................................... *H02P 3/14* (2013.01)

(58) Field of Classification Search
  CPC ................ H02P 3/12; H02P 3/14; H02P 3/22
  USPC .................. 318/479, 812, 400.3, 490, 494
  See application file for complete search history.

(56) References Cited

U.S. PATENT DOCUMENTS

| | | | |
|---|---|---|---|
| 7,042,178 B2 * | 5/2006 | Yamada et al. | 318/376 |
| 7,915,853 B2 * | 3/2011 | Ting | 318/803 |
| 8,860,341 B2 * | 10/2014 | Saeki et al. | 318/376 |
| 2011/0175557 A1 * | 7/2011 | Iwashita et al. | 318/400.3 |
| 2012/0106217 A1 * | 5/2012 | Sakakibara | 363/126 |
| 2013/0279214 A1 * | 10/2013 | Takase et al. | 363/37 |

FOREIGN PATENT DOCUMENTS

| | | |
|---|---|---|
| CN | 101728999 A | 6/2010 |
| JP | 4310617 B2 | 8/2009 |
| TW | 201201884 A1 | 1/2012 |
| TW | 201206009 A1 | 2/2012 |
| TW | 201226302 A1 | 7/2012 |

* cited by examiner

*Primary Examiner* — Eduardo Colon Santana
*Assistant Examiner* — Bickey Dhakal
(74) *Attorney, Agent, or Firm* — Novak Druce Connolly Bove + Quigg LLP

(57) ABSTRACT

An energy retrieving device includes a first rectifier circuit, a direct current (DC) link circuit, a second rectifier circuit, an energy retrieving unit, a motor controller, and a micro control unit (MCU). The MCU includes an energy retrieving control module, to control the energy retrieving unit to work according to control of a processing module. The processing module detects whether a motor deceleration signal is generated by the motor, and controls the energy retrieving control module to make the energy retrieving unit retrieve power when the motor deceleration signal is generated by the motor.

3 Claims, 1 Drawing Sheet

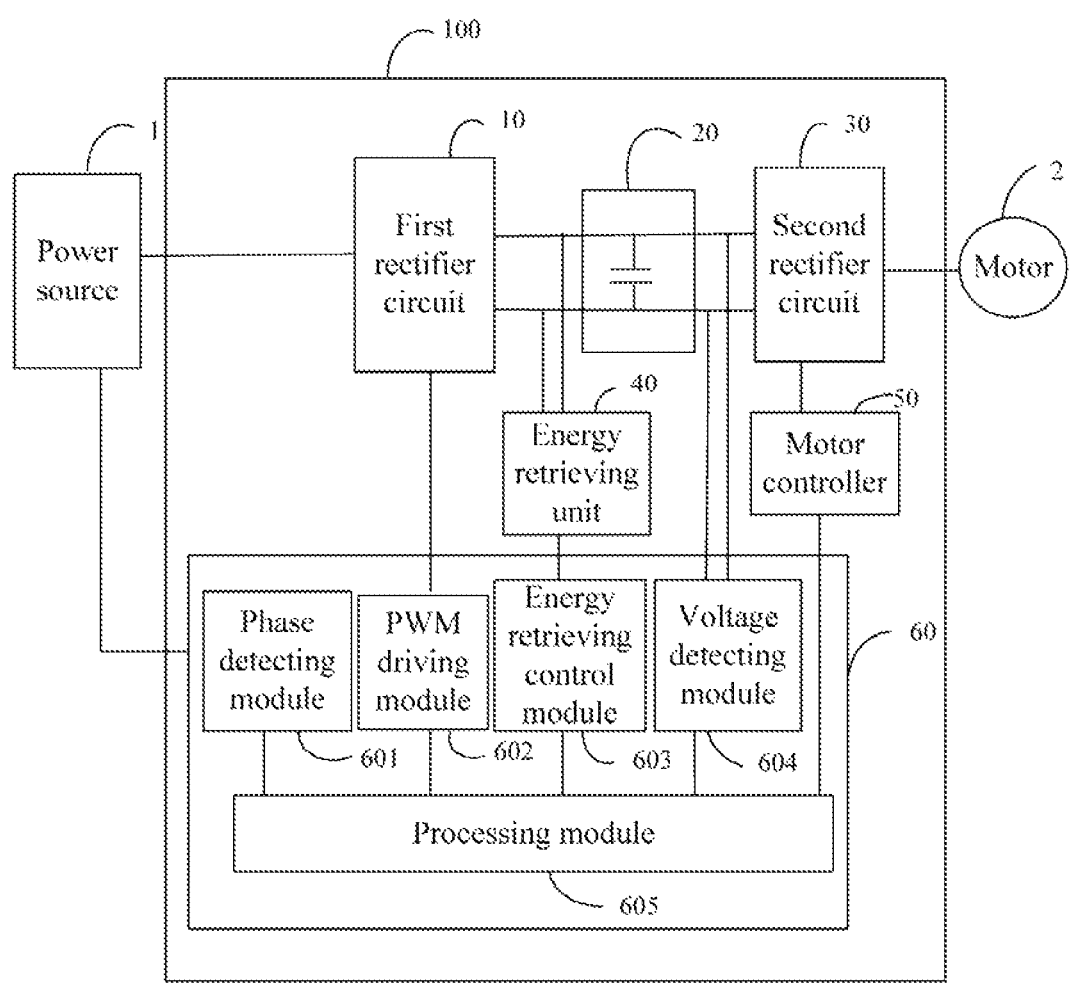

ENERGY RETRIEVING DEVICE

BACKGROUND

1. Technical Field

The present disclosure relates to energy retrieving devices, and more particularly to an energy retrieving device for retrieving energy from a motor.

2. Description of Related Art

During motor driving, a large drive current for acceleration is caused to flow in motor acceleration period, and a regenerative current is generated in deceleration period. However, the regenerative current generated in deceleration period is thermally consumed by a regenerative resistor, resulting in wasted energy. For example, when a motor of a computer numerical control (CNC) device is driven by a motor driving apparatus, the motor is accelerated via a large drive current. However, when the motor is decelerated, a regenerative current is generated and then the regenerative current is thermally consumed by a regenerative resistor, which is wasted.

What is needed is to provide an energy retrieving device for retrieving energy from the motor that can overcome the above-described limitations.

BRIEF DESCRIPTION OF THE DRAWINGS

The components in the drawings are not necessarily drawn to scale, the emphasis instead placed upon clearly illustrating the principles of at least one embodiment.

The drawing is a block diagram of an exemplary embodiment of an energy retrieving device.

DETAILED DESCRIPTION

Reference will be made to the drawing to describe certain exemplary embodiments of the present disclosure.

Referring to the drawing, an exemplary embodiment of an energy retrieving device 100 includes a first rectifier circuit 10, a direct current (DC) link circuit 20, a second rectifier circuit 30, an energy retrieving unit 40, a motor controller 50, and a micro control unit (MCU) 60.

The first rectifier circuit 10 is connected to a power source 1 to receive three-phase AC from the power source 1, and convert the three-phase AC to DC.

The DC link circuit 20 receives the DC from the first rectifier circuit 10 and transmits the DC to the second rectifier circuit 30. The DC link circuit 30 includes a storage capacitor with two terminals, connected to the first rectifier circuit 10 and the second rectifier circuit 30.

The second rectifier circuit 30 receives the DC from the DC link circuit 20 and converts the DC to AC.

The energy retrieving unit 40 is connected between the first rectifier circuit 10 and the second rectifier circuit 30.

The motor controller 50 controls the second rectifier circuit 30 to drive the motor 2.

The MCU 60 further includes a phase detecting module 601, a PWM driving module 602, an energy retrieving control module 603, a voltage detecting module 604, and a processing module 605.

The phase detecting module 601 detects a current phase of the three-phase AC, and sends the current phase to the processing module 605.

The PWM driving module 602 generates a Pulse Width Modulation (PWM) signal to the first rectifier circuit 10, to make a current phase of a regenerative current the same as that of the three-phase AC, when a regenerative current is generated in deceleration period.

The energy retrieving control module 603 controls the energy retrieving unit 40 to work according to control of the processing module 60.

The voltage detecting module 604 obtains a working voltage of the DC link circuit 20, and sends the obtained working voltage to the processing module 605.

The processing module 605 detects whether a motor deceleration signal is generated by the motor, controls the energy retrieving control module 603 to work to make the energy retrieving unit 40 retrieve power when the motor deceleration signal is generated by the motor 2. That is, the energy retrieving unit 40 stores energy when the motor deceleration signal is generated by the motor 2. The processing module 605 further receives the current phase of the three-phase AC sent by the phase detecting module 601, and controls the PWM driving module 602 to work according to the current phase of the three-phase AC, and thereby recharging power supply.

For a supplement, the processing module 605 can control the energy retrieving control module 603 to work when the working voltage of the DC link circuit 20 is larger than a predetermined value.

The time when the motor deceleration signal is generated is before the time when the working voltage of the DC link circuit 20 is equal to the predetermined value, therefore, the time that the energy retrieving device 100 starts to store energy is earlier than the time when the working voltage of the DC link circuit 20 is equal to the predetermined value.

It is to be further understood that even though numerous characteristics and advantages of preferred and exemplary embodiments have been set out in the foregoing description, together with details of the structures and functions of the embodiments, the disclosure is illustrative only; changes may be made in detail, especially in the matters of shape, size and arrangement of parts within the principles of the present disclosure to the full extent indicated by the broad general meaning of the terms in which the appended claims are expressed.

What is claimed is:

1. An energy retrieving device for retrieving power from a motor, comprising,
    a first rectifier circuit, to be connected to a power source to receive three-phase alternating current (AC) from the power source, and convert the three-phase AC to direct current (DC);
    a DC link circuit, to receive the DC from the first rectifier circuit and transmit the DC to a second rectifier circuit;
    the second rectifier circuit, to receive the DC from the DC link circuit and convert the DC to AC;
    an energy retrieving unit, connected between the first rectifier circuit and the second rectifier circuit;
    a motor controller, to control the second rectifier circuit to drive the motor; and
    a MCU comprising:
        an energy retrieving control module, to control the energy retrieving unit to work according to control of a processing module;
        the processing module, to detect whether a motor deceleration signal is generated by the motor, and control the energy retrieving control module to make the energy retrieving unit retrieve power when the motor deceleration signal is generated by the motor;
        a phase detecting module to detect a current phase of the three-phase AC; and
        a PWM driving module to generate a pulse width modulation (PWM) signal to the first rectifier circuit, to make a current phase of a regenerative current same as a current phase of the three-phase AC, when the regenerative current is generated in deceleration period;

wherein, the processing module is further to receive the current phase of the three-phase AC sent by the phase detecting module, and control the PWM driving module to work according to the current phase of the three-phase AC, and thereby recharging power supply.

2. The energy retrieving device of claim 1, wherein the MCU further comprises a voltage detecting module to obtain a working voltage of the DC link circuit, for a supplement, the processing module controls the energy retrieving control module to work when the working voltage of the DC link circuit is larger than a predetermined value.

3. The energy retrieving device of claim 1, wherein the DC link circuit comprises a storage capacitor with two terminals connected to the first rectifier circuit and the second rectifier circuit.

* * * * *